Fig. 4.

Inventor
Norton A. Newdick

Attorney

Fig. 6.

Patented Oct. 5, 1926.

1,601,978

UNITED STATES PATENT OFFICE.

NORTON A. NEWDICK, OF COLUMBUS, OHIO, ASSIGNOR TO THE COLODER COMPANY, OF COLUMBUS, OHIO, A CORPORATION OF DELAWARE.

LOADING MACHINE.

Application filed December 11, 1922. Serial No. 606,241.

This invention relates to improvements in loading machines and has for its primary object the provision of an improved loading machine constructed for the purpose of expeditiously removing minerals or ores, or other similar substances, from a surface upon which they are deposited, and mechanically transferring the same to suitable independently situated and actuated carriers for transportation to desired points of discharge.

In accordance with the invention, there is provided a loading machine which includes progressively arranged gathering and loading conveyors, mounted upon portable supporting means and pivotally carried thereby for relatively independent swinging movement, so that the primary conveyors will be enabled to carry or receive materials throughout their range of horizontal swinging movement, delivering the materials irrespective of the working positions which the said primary conveyors occupy, to the secondary or delivery conveyor, which is common to both of the gathering conveyors, whereby the materials may be finally discharged from the delivery conveyor into suitable cars, or other carriers or locations relatively remote from the original location of said materials.

One of the principal objects of the invention rests in improving the construction described in my application for loading machines, filed January 22, 1921, Serial Number 439,092, by providing a loading machine of the character set forth, with a pair of simultaneously operable gathering conveyors in lieu of the single gathering conveyor disclosed in said application, for the purpose of providing a loading machine possessing inherently a greater capacity for the loading of loose materials, and yet to provide simplicity in construction and the convenience in operation and control found in a machine possessing but a single gathering conveyor.

Other objects of the invention reside in providing the dual gathering conveyors of the machine with improved means for effecting horizontal sweep movement toward and away from each other; in the provision of an improved pony truck structure for supporting the forward ends of both of the gathering conveyors during the transportation of the machine over a track-way; in the provision of a motor arranged to be mounted upon the truck of a machine and having improved driving connections related thereto for the purpose of driving the endless conveying belts of both of said gathering conveyors, in constructing said driving machine so that the conveyor belts will be moved through equal distances of travel with respect to each other for the purpose of enabling the laterally projecting material conveying arms or flights of said belts to interfit during the passage of said flights along the return runs of said belt, and in the provision of means for imparting power to the driving elements of said truck from said motor.

Other objects will be in part obvious and in part pointed out hereinafter.

The invention further consists in the novel features of construction, combinations of elements and arrangements of parts, hereinafter fully described and pointed out in the claims hereunto appended.

In the accompanying drawings, forming a part of this specification, and in which similar characters of reference denote like and corresponding parts throughout the several views thereof:

Figure 1 is a top plan view of a loading machine constructed in accordance with the features of the present invention.

Figure 2 is a side elevation thereof.

Figure 2ª is a detail view.

Referring more particularly to the details of the invention, as the latter has been illustrated in the accompanying drawings, the numeral 1 designates a truck or other portable base upon which the conveyors of the machine are mounted for transportation. In this instance the truck is formed to comprise a substantially rectangular frame, consisting of parallel longitudinally extending sides 2, a front member 3 and a rear member 4. The sides 2 are formed with journals arranged for the reception of axles 5, carrying wheels 6, arranged for travel over a suitable trackway 7.

Formed with the front member 3 of the truck is a forwardly projecting shelf 8, disposed in a substantially horizontal plane. Mounted upon the shelf 8 is a reversible type of an electric motor 9, whose armature shaft is equipped with a bevel pinion 10, arranged to engage with a bevel gear 11 provided upon the outer periphery of the driving member 12 of a multiple disc clutch 13. The driven member 14 of said clutch is fixed for rotation upon a shaft 15, extending obliquely with respect to the armature shaft of the motor 9; the said shaft 15 being suitably supported for rotation within bearings 16, mounted stationarily upon the shelf 8.

Figure 5:
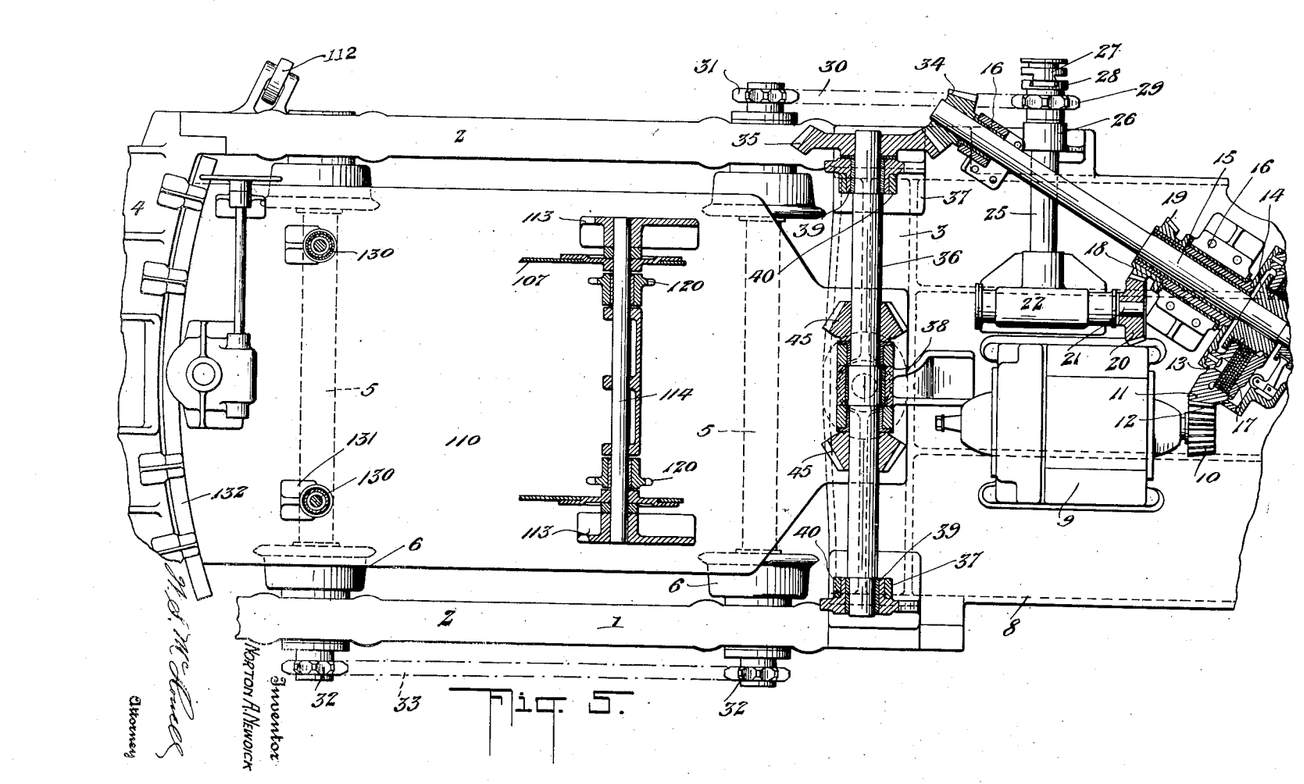
Figure 5 is a horizontal sectional view taken on the plane indicated by the line 5—5 of Figure 4.
Figure 6:
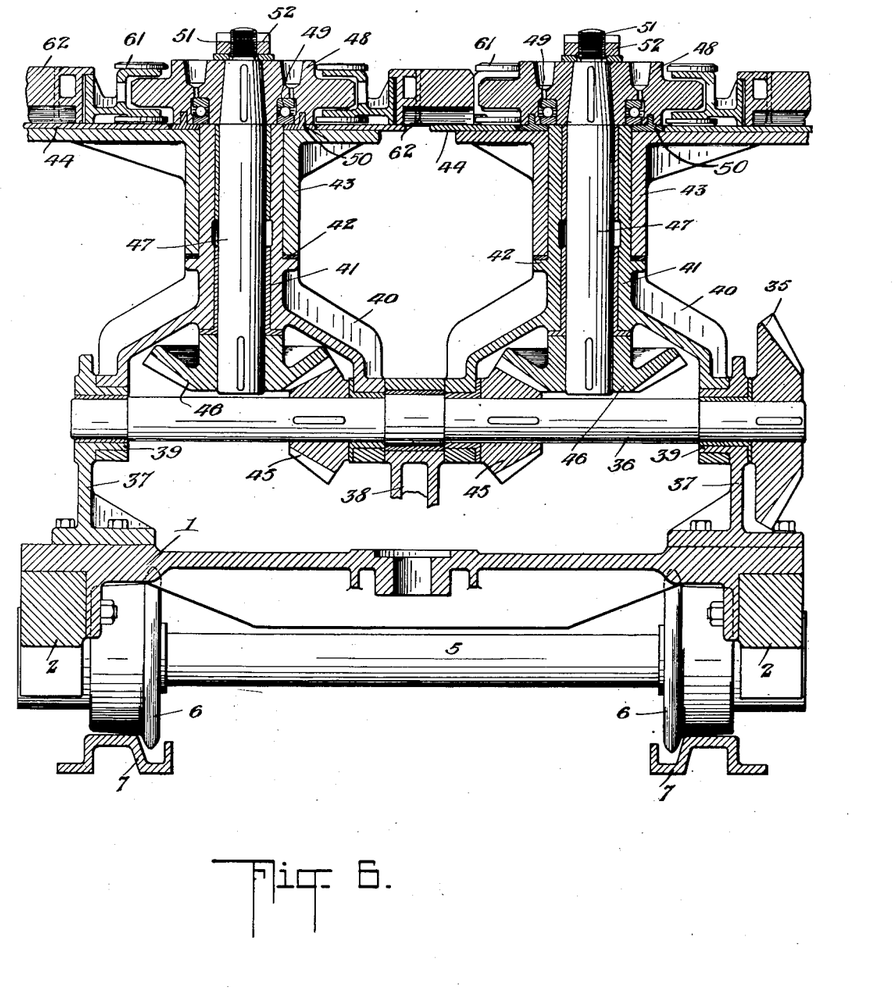
Figure 6 is a vertical transverse sectional view taken on the line 6—6 of Figure 4, and disclosing particularly the pivotal supports for the gathering conveyors.

It will be understood that friction discs 17 are interposed, as shown in Figure 5, between the driving and driven members of said clutch, whereby upon the application of pressure to said discs, effected through any suitable means, the said members 12 and 14 are connectable for imparting rotary movement from the motor 9 to the shaft 15. A clutch of this type is preferred because of the ease with which it may be operated in controlling the rotation of the shaft 15 during the operation of the motor 9, and also because of its ability to relieve overload on conveyor parts driven from said motor.

The driving member 12 of the clutch 13 is provided with a sleeve 18, rotatably received within the forward of the bearings 16, and so arranged that said sleeve may rotate simultaneously with the driving member. The outer end of the sleeve 18 is equipped with a bevel gear 19, rotatable in unison with the sleeve 18, and arranged for meshing engagement with a similar gear 20, fixed upon the forward end of a worm shaft 21. This shaft is arranged for rotation within the upper part of a casing 22 situated on the shelf 8 adjacent the motor 9. Within the casing 22 the shaft 21 is provided with a worm 23, arranged to engage with a worm gear 24. The gear 24 is carried upon the inner end of a transversely extending shaft 25, which has its inner end journaled for rotation within the casing 22 and its outer end received for rotation within a bearing 26, carried by the shelf 8, contiguous to one edge thereof. By this construction it will be seen that upon the rotation of the driving member 12 of the clutch 13, movement will be imparted to the sleeve 18 independently of the rotation of the shaft 15. From the sleeve 18 movement is imparted to the shaft 21 by the meshing gears 19 and 20, and by the worm gearing 23 and 24 rotary movement is imparted to the shaft 25. The outer end of said shaft is equipped with a feathered clutch 27, arranged to be thrown into or out of engagement with a clutch face 28 provided upon a sprocket 29, which is loosely carried upon the outer end of the shaft 25.

Around the sprocket 29 there is trained an endless chain 30, which leads to a similar sprocket 31 fixed upon one end of the forward axle 5. Thus, when the clutch 27 is thrown into engagement with the jaws of the face 28 forward or backward movement will be imparted to the truck to enable the latter to operate over the track-way 7. Preferably, as shown in Figure 5, both of the axles 5 are equipped with sprockets 32, connected by means of a chain 33 for the purpose of imparting power to all of the axles 5, enabling said wheels 6 to function as drivers, and thereby obtain the maximum tractive effort of the machine.

The rear end of the obliquely extending shaft 15 is provided with a bevel pinion 34, disposed for engagement with a bevel gear 35 keyed upon one end of a shaft 36, extending transversely across the front end member 3 of the truck 1. This shaft 36 is carried for rotation within bearings 37, arising from the truck 1 adjacent the forward end of the latter and contiguous to its sides, and also, in an intermediate bearing 38 disposed midway of the shaft 36 and situated between the bearings 37. The bearings 37 are formed with integral bosses 39, upon which are trunnioned the lower yoke shaped ends 40 of a pair of swinging saddle or journal members 41, which members are formed to include collars 42 upon which rests the lower ends of flange castings 43, carried by the under part of gathering conveyor frames 44. It will be observed that the saddle members extend vertically through the sockets provided therefor in the flange castings 43, and therefore by the agency of this construction the gathering conveyor frames are pivotally supported upon the members 41 to turn about vertical axes provided by the upper ends of said members, and also to swing bodily vertically with said members about the horizontal axis afforded by the shaft 36, or more strictly speaking, the bosses 39. In this connection it will be observed that the saddle members and the frames 44 are not directly mounted on the shaft 36, but are carried by the bearings 37 and 38, in which the shaft 36 is rotatably mounted. This construction enables the shaft 36 to turn freely.

Fixed to rotate with the shaft 36 is a pair of pinions 45, which mesh with bevel gears 46 carried upon the lower ends of vertically disposed head shafts 47, which are arranged for rotation within bearings provided in the saddle members 41. The upper ends of the head shafts 47 are tapered for the reception of drive or head sprockets 48, which rotate upon thrust bearings 49 and rest upon wear rings 50, interposed between the flange castings 43 and the sprockets 48. The extreme upper ends of the shafts 47 are reduced and threaded as at 51 for the reception of binding nuts 52, used in holding the sprockets 48 in place. It will be observed that the shafts 47 are driven in unison by the bevel gearing employed for the purpose of enabling the head sprockets to rotate in timed order. In this connection it will be observed that the slip clutch 13 is located between the motor 9 and the gearing 45 and 46, for the purpose of insuring the time of rotation of the head shafts 47.

The gathering conveyor frames 44 are preferably formed from structural sheet metal suitably braced and reinforced to produce a rigid stucture, and the said frames are of elongated construction and are each formed to comprise horizontally extending elevated or discharge ends 53, forwardly and downwardly inclined portions 54 and flat substantially horizontally extending forward or nose extremities 55. The extremities 55 are disposed in advance of the truck 1 and, when the machine is in operation, are adapted to rest upon the ground, so as to pass under the materials to be gathered during horizontal sweep movement of the gathering conveyors about the substantially vertical axes provided by the saddle members 41. By mounting the saddle members for oscillation in a vertical plane, the gathering conveyors may swing vertically, accommodating the extremities 55 thereof to irregularities in the surface over which they pass. The peripheries of the extremities 55 are reinforced by strips 56, which includes downwardly and outwardly inclined surfaces for the purpose of facilitating the passage of the extremities 55 beneath the materials to be gathered.

Figures 10, 11, 12:
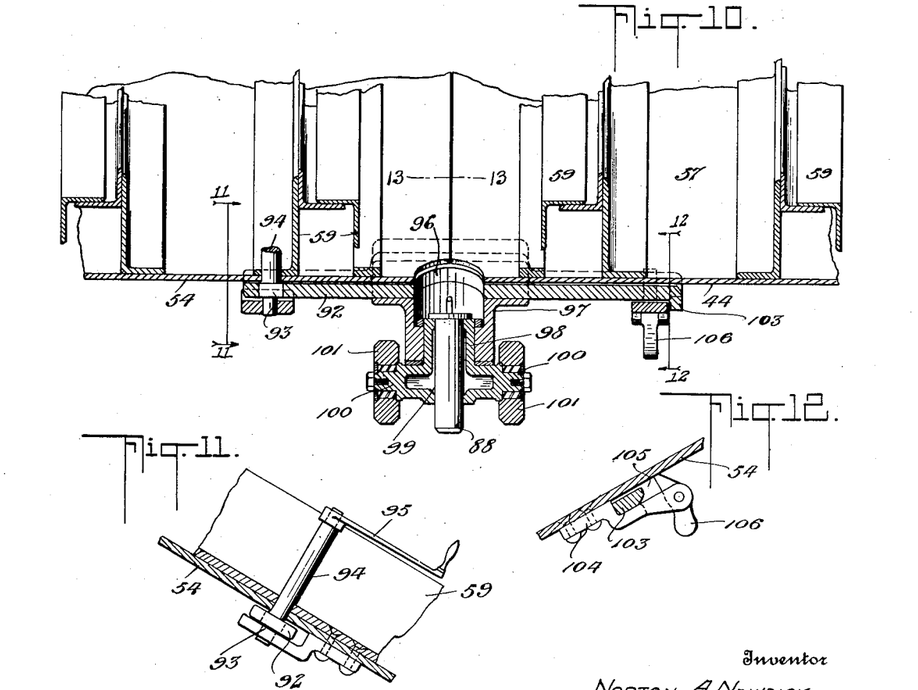
Figure 10 is a sectional view taken on the line 10—10 of Figure 9.
Figure 11 is a section on the line 11—11 of Figure 10.
Figure 12 is a similar view on the line 12—12 of Figure 10.
Figure 13:
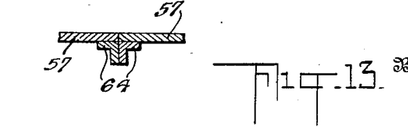
Figure 13 is a detail view.

The frames 44 each include a flat sheet metal bottom 57 terminating at the outer edges in longitudinally extending upwardly projecting sides 58, and mounted upon the bottom 57 of each frame are substantially parallel longitudinally extending belt guides 59, shown in cross section in Figure 10. The guides 59 are so terminated at their upper ends to enable the sprockets 48 to constitute continuations thereof, and similarly, sprockets 60 are situated upon the lower or nose extremities 55 of said frames and constitute continuations of the lower ends of said guides.

Arranged to pass around the sprockets 48 and 60 and to pass through the guides 59, upon each of the frames 44, is an endless conveyor belt 61, in the form of a link chain, and from the links thereof project laterally extending conveying arms or flights 62, which are arranged to project into material conveying ways or troughs 63 provided in the frames 44 between the sides 58 and the belt guides 59. It will be observed that the going and return runs of said belt occupy corresponding planes, and that upon the rotation of the sprockets 48 movement will be imparted to said belts, whereby when the machine is in operation, the flights passing in an arcuate course around the foot sprocket 60 close to the surface upon which the extremities 55 are resting, will be brought into sweeping engagement with the materials to be gathered, drawing such materials onto the machine and passing the same longitudinally in the line of draft of the machine through the conveying ways or troughs 63.

The frames 44 at their rear ends are terminated so that the flights 62 in passing around the head sprockets 48 will project over the ends of said frames, thereby enabling materials passing through the troughs 63 to be discharged by gravity from the rear elevated discharge ends 53 of the frames 44. By the present construction a plurality of gathering conveyors are attacking the materials to be loaded instead of but a single conveyor, as disclosed in machines of the prior art, and consequently the machine has substantially double the capacity of the ordinary single conveyor type of machine.

Figures 1, 2, 2A:
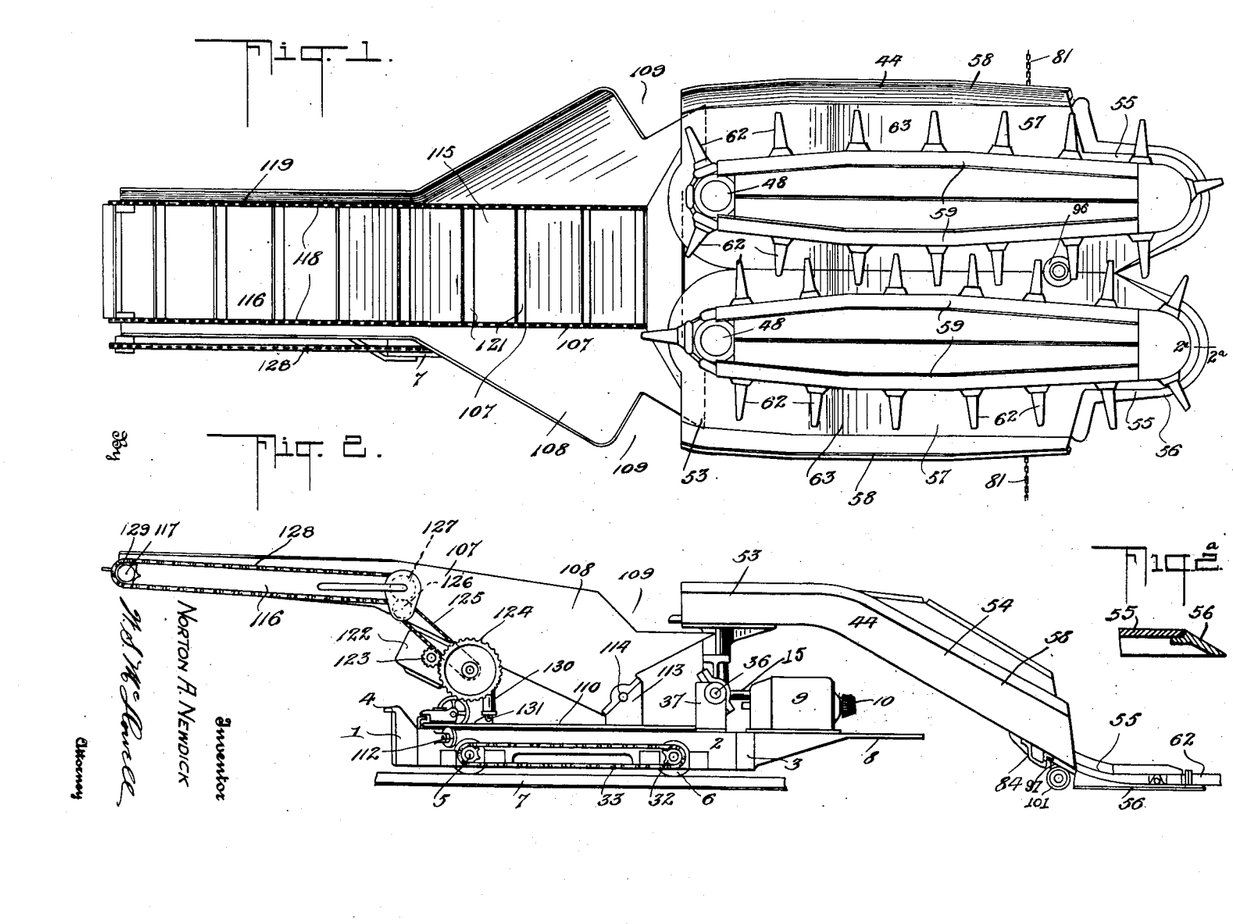
Figure 3:
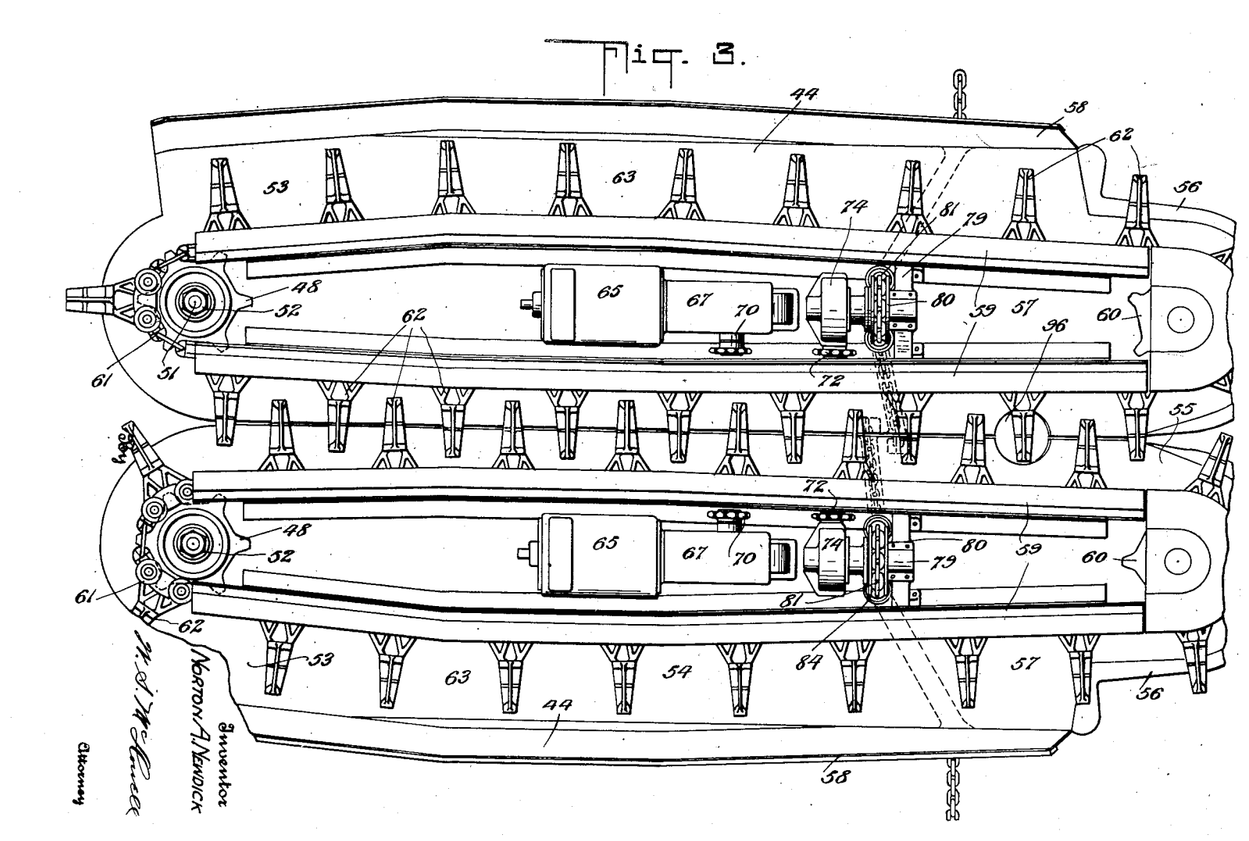
Figure 3 is a plan of the dual gathering conveyors of the machine.

Along the inner longitudinal edges of the bottoms 57 depending angle members 64 are provided for limiting the inward swinging movement of the gathering conveyor frames. It will be noted that the inner edges of these frames are not provided with sides, as are their outer edges. This enables the flights of the return runs of the belts 61 to interfit as shown in Figure 3, overlapping the bottoms of adjoining frames. Therefore, a construction in provided in which the width of both of the gathering frames is maintained at a minimum. Any slight vertical movement which may take place relatively between the frames 44, is taken care of by the flexibility in the belts 59.

Figures 7, 8:
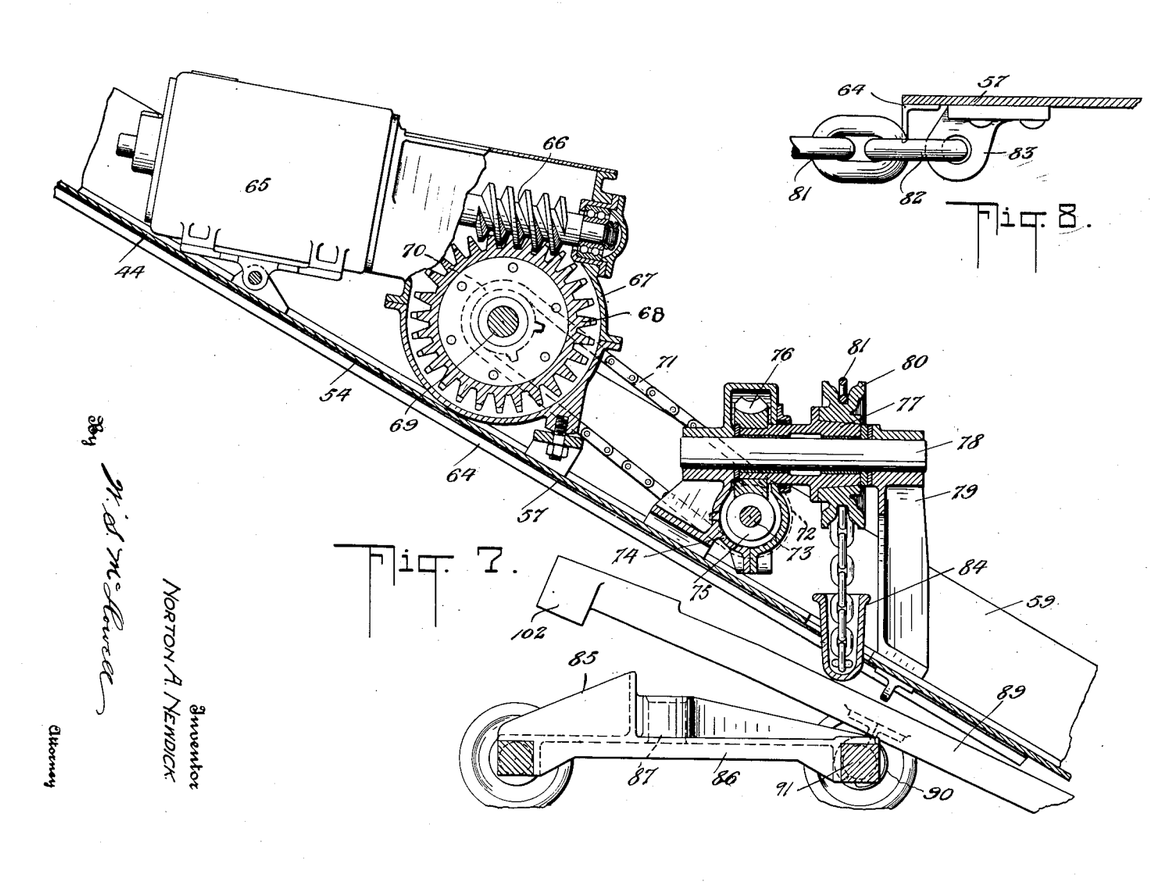
Figure 7 is a vertical sectional view taken through the side swinging mechanism of one of said gathering conveyors.
Figure 8 is a detailed sectional view disclosing the connection between the frame of one of the gathering conveyors and one of the side swinging chains.

To swing the gathering conveyors bodily and horizontally about the vertical axial supports provided by the saddle members 41, there is mounted upon each of the frames 44 between the guides 59 thereof, a reversible electric motor 65, shown more particularly in Figure 7. Connected with the armature shaft of each of the motors 65 is a worm 66, arranged for rotation within adjustable casings 67 carried in connection with the field frame of the motor 65. Arranged to mesh with the teeth of the worm 66 is a worm gear 68, arranged for rotation with the horizontally extending shaft 69, also rotatably carried in bearings provided in connection with the casings 67. The outer end of the shaft 69 is formed to include a sprocket 70, around which is trained an endless chain 71, leading to a sprocket 72 mounted on a worm shaft 73, rotatably carried in connection with a second casing 74. The flexibility provided by the chain 71, allows, of course for relative variations in position of the casings 67 and 74.

Mounted upon the shaft 73 is a worm 75, meshing with a worm gear 76, fixed for rotation with a sleeve or quill 77, which rotates about a fixed shaft 78 carried in connection with the casing 74 and an outer bearing 79. Fixed for rotation with one end of the quill 77 is a pocketed sheave wheel 80, mounted upon each of the gathering conveyors, as disclosed in Figure 3. Arranged to pass around the wheel 80 of each frame 44 is an ordinary anchor chain 81, which has its inner end 82 secured, as shown in Figure 8, to a bracket 83, permanently carried in connection with the other of the frames 44. The intermediate portion of the chain described passes around the wheel 80 and is received within the pockets of the latter, and is then directed through hawse guides 84 outwardly toward the sides of the frame. The extreme outer end of this chain is then adapted for connection with jacks or other anchoring devices placed laterally of the machine. It will be seen, from this construction, that when the pocket sheave wheel 80 is rotated in an anti-clockwise direction, looking from the front end of the machine, the gathering conveyor associated therewith will be swung bodily and horizontally toward the point of anchorage of the chain 81 and away from the longitudinal center line of the machine. Similar movement is of course simultaneously imparted to the other gathering conveyor, enabling both conveyors to be fed simultaneously into the work.

I preferably control the operation of both of the motors 65 from a single controller, for the purpose of simplifying the controls on the machine and to enable both of the frames 44 to be operated synchronously. After the frames 44 have assumed the limits of their outward swinging movement, the same are drawn together by reversing the direction of rotation of the pocket sheave wheels 80. This causes the frames to be forced together, and the movement continues until the inner edges of said frames meet one another. The machine may then be fed forwardly by the operation of the propelling mechanism on the truck 1, so that the nose extremities 55 of said frames may be forced farther into the body of materials to be gathered, after which the conveyors are swung laterally and outwardly in gathering engagement with said materials in a manner previously described. The hawse guides 84 serve to properly guide the chains 81 during the passage of the latter around the wheels 80, enabling said chains to properly engage with the pockets of said wheels, and also to permit the slack sides of said chain to be properly released from the pockets of said wheels.

Figure 9:
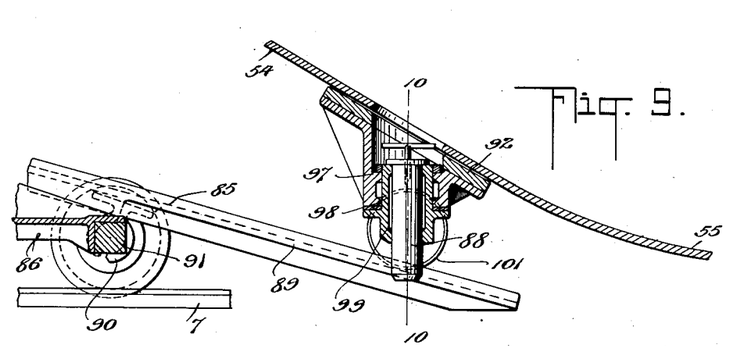
Figure 9 is a vertical sectional view of the pony truck structure.

During the transportation of the machine over the track-way 7 it is necessary to support the front ends of the frames 44. This is accomplished through the medium of a pony truck structure 85, which is common to both of the gathering conveyors. This structure, as disclosed in Figures 7 and 9, includes a wheeled truck 86, in which the frame thereof is formed with a centrally disposed socket 87, arranged for the reception of a king bolt 88, carried by the gathering conveyors and by means of which the pony truck is swiveled in connection with the front end of the machine, so as to properly adapt itself to curved track-ways. To lower the front end of the machine upon the pony truck; the latter is provided with a pair of elongated skids 89, which are pivoted as at 90, upon the front axle 91 of said truck, so that the skids may assume the positions disclosed in Figures 7 and 9 immediately preparatory to the loading of the machine upon said pony truck. However, after the loading operation has been effected, the skids will be oscillated about the axles 91 so as to assume a substantially horizontal position, free from interference with the bed of the track-way 7.

The king bolt 88 is supported from the frames 44 by providing one of the latter with a swinging plate 92, pivotally mounted at one end as at 93, and arranged to be swung to assume the position spanning the inner edges of the frames 44 when the latter are positioned for loading upon the pony truck. To swing the plate the pivotal end of the latter is formed to receive the squared portion of an upstanding shaft 94, upon which is mounted a crank arm 95, which upon manipulation will rotate the shaft 94 so as to move the plate 92 through substantially 90 degrees of movement.

For the purpose of enabling the king bolt 88 and its supporting structure to occupy an elevated inactive position beneath one of the frames 44 when the machine is employed in gathering operations, however, when adapted for transportation, the said plate may be swung to assume its lower position, extending transversely of the frames 44 and situated so that the king bolt will be located centrally of the machine, and in registration with recesses 96 formed in the inner edges of the frame bottoms 57, by means of which recesses the king bolt is rendered accessible. It will be observed that the actuating shaft 94 projects upwardly through the belt guides 50, so as to avoid interference with the movement of the flights 62.

The plate 92 is formed to include a depending bearing 97 in which is rotatably received a sleeve 98 formed to include a socket 99 in which the king bolt is vertically adjustable. The sleeve 98 includes laterally and transversely extending shaft extensions 100, arranged for the reception of rollers 101, which are transversely spaced a sufficient distance so as to be received upon and to ride upon the skids 89 during rearward movement of the machine as a whole with respect to the pony truck. It will be observed that after the rollers 101 pass the center of the front axle 91, the skids will be rocked bodily to assume a position substantially in a horizontal plane, the downward movement thereof being limited by the rear ends 102 of said skids engaging with the rear axle of the pony truck. Further, the rearward movement of the machine will bring the king bolt into alignment with the socket 87, whereby upon the lowering of said bolt the pony truck will be swiveled in connection with the front end of the machine.

Undue movement on the part of the plate 92 is prevented by providing the free end of the latter with an extension 103, so disposed that when the plate occupies a position bringing the king bolt into registration with the recesses 96, the said extension 103 will be received within a cleat 104 connected with one of the frames 44. This cleat is provided with a recess 105, in which the extension is positioned, and the entrance to said recess is closed by a pivoted detent 106, which is manually tripped to release the extension 103 from the recess 105.

In order to facilitate the direction and discharge of materials from the machine, I provide in connection with the gathering conveyors a loading or delivery conveyor 107. This conveyor includes a flaring walled hopper 108, having the forward part thereof arranged immediately beneath the rear elevated ends 53 of the frames 44, so that materials discharged from said frames will drop by gravity and without obstruction into the hopper 108. It will be observed that the front corners of said hopper are cut away as at 109, in order that the hopper may be positioned beneath the gathering conveyors at its front end and yet possess sides of sufficient height to confine materials discharged from the gathering conveyors within the limits of the hopper, the cut-away portions 109 permitting the frames 44 to swing throughout their entire range of movement without interference from the hopper structure.

Figure 4:
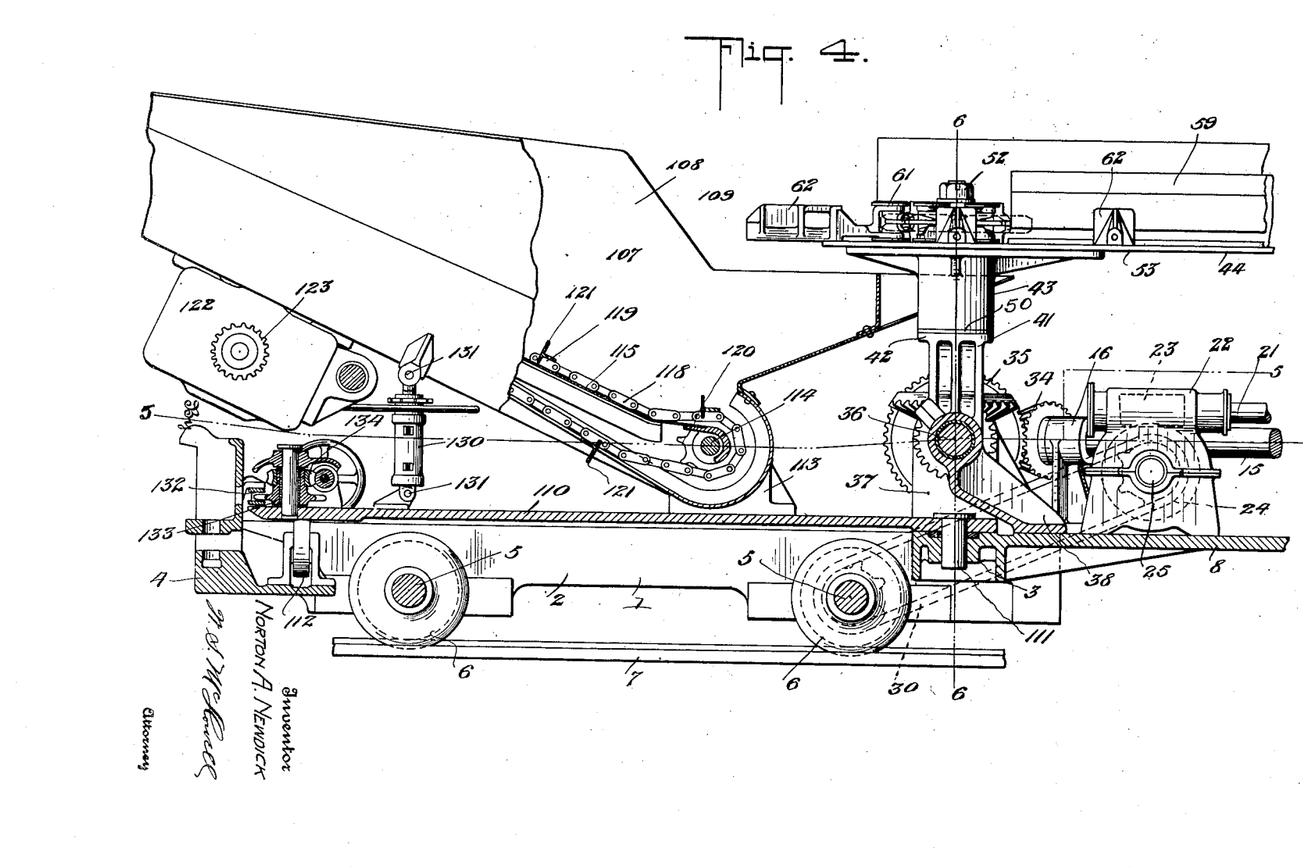
Figure 4 is an enlarged vertical sectional view taken through the supporting truck of the machine and the co-operating extremities of the gathering and delivery conveyors.

The loading conveyor 107 is supported, as shown in Figure 4, upon a bed plate 110, which is pivoted as at 111 to the front member 3 of the truck 1, the said plate being disposed in a substantially horizontal plane above the truck and has its free or rear end mounted upon rollers 112, carried by the frame of the truck 1. Arising from the bed plate is a pair of brackets 113, disclosed in Figure 5, the said brackets carrying a transversely extending shaft 114, upon which the forward and lower end of the delivery conveyor 107 is pivotally mounted, the shaft 114 serving as a horizontal pivot for the purpose of permitting of swinging movement of the delivery conveyor in a vertical plane.

The said delivery conveyor is provided with an upwardly inclined bottom 115, which also constitutes the bottom of the hopper 108, and extends rearwardly of the machine. From the bottom 115 the delivery conveyor terminates rearwardly in an overhanging extension 116, arranged to occupy a plane considerably above the truck 1, in order that a mine car or the like may be positioned beneath the extension 116 and into which car the materials handled by the machine are delivered. The extreme end of the extension 116 is provided with a shaft 117 carrying sprockets, around which are trained the transversely spaced longitudinally extending chains 118 of a loading conveyor belt 119, the said chains 118 being placed around sprockets 120 mounted on the shaft 114. Transversely extending flights 121 unite the chains 118 and are arranged to pass over the bottom 115 of the delivery conveyor, whereby upon movement of the belt 119 materials deposited within said hopper will be engaged with the flights 121 and moved rearwardly out of the hopper along the elevated extension 116, and thence discharged into a carrier placed beneath said extension.

To operate the belt 119 the under part of the conveyor is provided with a motor 122, having its armature shaft equipped with a pinion 123, driving an enlarged gear 124. Rotatable with this gear is a sprocket around which is trained an endless chain 125, which passes over a similar sprocket driving a gear 126, in mesh with a second gear 127 which also rotates a sprocket. An endless chain 128 passes around said latter sprocket and leads to a sprocket 129 carried by the shaft 117. By means of this construction movement may be readily imparted to the delivery conveyor.

The delivery conveyor is capable of being adjusted vertically by means of a plurality of telescopic standards 130, which are pivoted as at 131 to the bed plate 110, and also to the delivery conveyor frame.

To adjust the delivery conveyor laterally, the truck 1 is provided with an arcuate rack 132, and the bed plate carries a gear 133 arranged to mesh with said rack. The gear 133 is operated by manually controlled worm gearing 134, which in conjunction with the rollers 112 enables the bed plate and the delivery conveyor mounted thereon to be readily and conveniently shifted in a horizontal plane.

In view of the foregoing description it will be seen that the present invention provides a loading machine wherein improved arrangement of gathering conveyors is present, which conveyors operate to produce a machine of high loading capacity and are mechanically co-ordinated to operate without interference with each other, and with all necessary convenience and co-operation in the rapid loading or recovery of loose materials. It will be observed that the conveyors are capable of being forced apart or drawn together by means of mechanism operated by the motors 65, which in turn may be governed by a single controller mounted upon the bed plate 110, or any other convenient point on the machine. The construction employed is simple, positive and convenient, and is not likely to become out of order and occasion adjustment or repair.

What is claimed is:

1. In a loading machine, a portable truck base, a pair of elongated inclined gathering conveyors, independent supports between said base and the rear elevated ends of said conveyors, said supports permitting said conveyors to swing horizontally with the front ends thereof arranged in advance of said truck, horizontal pivotal connection between said supports and said base, permitting said conveyors to vibrate vertically and independently of each other, and a delivery conveyor mounted upon said base and situated to receive materials discharged from both of said gathering conveyors.

2. In a loading machine, a portable base unit, a pair of independently mounted supports carried by said base unit and mounted for oscillation in vertical planes, a pair of gathering conveyors having the rear ends thereof journaled upon the upper ends of each of said supports, whereby said conveyors may swing bodily in horizontal planes from said supports and vibrate vertically in unison with said supports, an endless belt carried by each of said conveyors, means for simultaneously operating said belts, and a delivery conveyor situated upon said base unit and arranged to receive materials discharged from either of said conveyors.

3. In a loading machine, a portable base unit, a pair of elongated inclined gathering conveyors, independently mounted supporting means between the elevated rear ends of said conveyors and said base unit, a motor for operating said conveyors carried by said base unit, driving connections between said motor and conveyors passing through said supporting means, and means carried by said conveyors for swinging the latter about the pivotal mountings thereof afforded by said supporting means.

4. In a loading machine, a portable base unit, a pair of elongated inclined gathering conveyors, a pair of saddle members horizontally pivoted to said base unit, vertical pivotal connections between the upper elevated ends of said conveyors and said saddle members, conveyor driving shafts journaled in said members, and means for driving said shafts without interfering with the swinging of said saddle members in vertical planes, or the rotation of said conveyors about said saddle members.

5. In a loading machine, a portable base unit, a pair of gathering conveyors, pivoted supporting means between said conveyors and said base unit, a shaft about the axis of which said conveyors swing vertically, power transmission connections between said shaft and said conveyor, a motor mounted upon said base unit and power transmission devices between said motor and said shaft.

6. In a loading machine, a portable base unit, a plurality of bearings carried by said base unit, a shaft journaled in connection with said bearings, swinging saddle members mounted in connection with said bearings and arranged to swing in vertical planes about the axis of said shaft, elongated inclined gathering conveyors having the rear elevated ends thereof pivotally mounted upon the upper ends of said saddle members, power transmission devices between said shaft and said conveyors, a motor, and a power transmission device between said motor and said shaft.

7. In a loading machine, a portable base unit, a plurality of stationary bearings formed in connection with said base unit, a shaft journaled in said bearings, a pair of independently swinging saddle members mounted upon said bearings, a pair of elongated inclined gathering conveyors having the upper and rear extremities thereof pivotally mounted upon said saddle members, conveyor driving means journaled in connection with said saddle members, and means for rotating said shaft to effect the operation of said conveyor driving means.

8. In a loading machine, a portable base unit, bearings formed with said base unit, a shaft journaled in said bearings, swinging saddle members journaled upon said bearings and arranged for oscillation about the axis of said shaft, elongated inclined gathering conveyors arranged above and in advance of said base unit, vertical pivotal connections between the rear elevated ends of said gathering conveyors and said saddle members, means for driving said conveyors passing through said saddle members, motor driven means for rotating said shaft, and power transmission devices between said shaft and the conveyor operating means of said saddle members for uniformly operating said gathering conveyors.

9. In a loading machine, a portable base unit, a pair of swinging supports mounted upon said base unit, elongated inclined gathering conveyors having the rear elevated ends thereof pivotally mounted upon said supports, a motor mounted upon said base unit, a power transmission device between said motor and conveyors, and a delivery conveyor into which both of said gathering conveyors discharge, and a horizontally swinging support upon which said delivery conveyor is mounted, said latter support being arranged independently of said first named supports.

10. In a loading machine, a pair of elongated inclined gathering conveyors, supports beneath the rear elevated ends of said conveyors permitting the latter to swing bodily and horizontally, a power driven wheel element arranged for rotation upon each of said conveyors, and a flexible cable for each of said conveyors, said cable having the intermediate portion thereof trained around said wheel element, the inner end of said cable being fastened to the other of said conveyors and the outer end of said cable being adapted for connection with laterally placed anchoring means arranged independently of said conveyors.

11. In a loading machine, in combination, a portable supporting base, a pair of elongated inclined gathering conveyors extending to points in advance of said base, pivotal supports between said base and the rear elevated ends of said conveyors, an endless conveying belt carried by each of said conveyors, laterally projecting arms formed with said belts, material conveying ways formed in said conveyors through which the advancing runs of said belts travel, and a common way through which the idle or return runs of said flights travel.

12. In a loading machine, in combination, a portable base unit, a pair of elongated inclined gathering conveyors arranged to project in advance of said base unit, means disposed between the rear elevated discharge ends of said conveyors and said base unit, pivotally supporting said conveyors for horizontal swinging movement, an endless conveying belt mounted upon each of said conveyors, laterally projecting flights carried by said belts, the return runs of said belts being situated contiguous to each other permitting the flights of said belts to interfit along the return runs thereof, and means for synchronously driving said belts to maintain the flights of said belts in proper relation.

13. In a loading machine, a portable base unit, a pair of elongated inclined gathering conveyors, supporting means between the rear elevated ends of said conveyors and said base unit, said supporting means functioning to admit of horizontal sweep movement on the part of said conveyors, and side swinging mechanism mounted upon each of said conveyors, and operated to effect horizontal oscillation of said conveyors toward and away from each other.

14. In a loading machine, in combination, a portable base unit, a plurality of elongated inclined gathering conveyors arranged above and in advance of said base unit, supporting means between said base unit and the rear elevated ends of said conveyors, said supporting means permitting the conveyors to swing horizontally independently of said base unit, a motor driven wheel element rotatably mounted upon each of said conveyors, side swinging chains having the intermediate portions thereof trained around said wheel elements, the inner ends of said chains being connected with the conveyor other than the conveyor carrying the wheel element around which the chain is trained, the outer ends of said chains being adapted for connection with anchoring means disposed laterally and independently of said conveyors, and hawse guides carried by said conveyors for the reception and guidance of said chains.

15. In a loading machine, a portable support, a pair of elongated inclined gathering conveyors pivotally mounted upon said base unit, and arranged to project in advance thereof, a pony truck, a latch member for uniting said conveyors in connected relation and a king bolt carried by said latch member and arranged for co-operation with said pony truck to pivotally connect the latter with said conveyors.

16. In a loading machine, in combination, a portable base unit, a pair of elongated inclined gathering conveyors, supports pivotally connecting the rear elevated ends of said conveyors with said base unit, a pony truck for supporting the outer ends of said conveyors, a hinged latch member for uniting said conveyors in adjoining relation, a vertically adjustable king bolt carried by said latch member and co-operative with said pony truck to pivotally connect the latter with said conveyors, and means for limiting the swinging movement of said hinge member to align the king bolt carried thereby with recesses formed in said conveyors.

In testimony whereof I have signed my name to this specification.

NORTON A. NEWDICK.